United States Patent [19]
Hibino et al.

[11] Patent Number: 5,737,651
[45] Date of Patent: Apr. 7, 1998

[54] INFORMATION PROCESSING DEVICE AND METHOD

[75] Inventors: Hideo Hibino, Kanagawa-ken; Kazuyuki Kazami, Tokyo; Norikazu Yokonuma, Kanagawa-ken; Tetsuya Takano, Saitama-ken, all of Japan

[73] Assignee: Nikon Corporation, Tokyo, Japan

[21] Appl. No.: 547,292

[22] Filed: Oct. 24, 1995

[30] Foreign Application Priority Data

Oct. 26, 1994 [JP] Japan .................................. 6-262277

[51] Int. Cl.$^6$ ........................................... G03B 17/24
[52] U.S. Cl. ........................ 396/303; 396/319; 360/75
[58] Field of Search ................................ 396/301, 303, 396/319, 320; 360/75

[56] References Cited

U.S. PATENT DOCUMENTS

| | | |
|---|---|---|
| 4,003,063 | 1/1977 | Takahashi et al. .................... 396/303 |
| 4,737,867 | 4/1988 | Ishikawa et al. ...................... 360/75 |
| 5,247,321 | 9/1993 | Kazami .................................. 396/319 |
| 5,321,452 | 6/1994 | Tsujimoto ............................. 396/319 |
| 5,450,149 | 9/1995 | Cocca ................................... 396/319 |
| 5,481,322 | 1/1996 | Wakabayashi ........................ 396/320 |
| 5,579,186 | 11/1996 | Yamamoto et al. .................. 360/75 |

*Primary Examiner*—A. A. Mathews
*Attorney, Agent, or Firm*—Oliff & Berridge

[57] ABSTRACT

An information processing device configured to conserve power consumption of the battery. The device uses a recording medium with a magnetic recording unit. A power source supplies power to at least one assembly, which retrieves and/or records information on the recording medium. The power is supplied to retrieve and/or record information only when the respective assembly is in operation. The device can be a camera using film as the magnetic recording medium.

50 Claims, 8 Drawing Sheets

INFORMATION PROCESSING DEVICE AND METHOD

BACKGROUND OF THE INVENTION

1. Field of the Invention

The present invention relates to an information processing device, such as used in a camera. The information processing device records and retrieves information on a magnetic recording medium, such as film.

2. Description of Related Art

Information processing units, which can record and retrieve information, are known. For example, in Japanese Unexamined Patent Publication 4-360135, a camera can record information on a magnetic track provided on film. The recorded information can be retrieved using a magnetic retrieval head. The film can include a plurality of these magnetic tracks, where the recording and retrieval of information are performed by a corresponding plurality of recording and retrieval heads.

However in this known device, the time period for supplying power to the magnetic recording circuit, which comprises the recording head, and the magnetic retrieval circuit, which comprises the retrieval head, is not controlled nor a concern. Thus, in some known devices the power or energy is supplied to the retrieval and recording circuits regardless of need of power and concern for the supply power time period. For example, if only one track on the recording medium is used for storage of information and the device includes two circuits for the recording and retrieval of information, power is supplied to both circuits regardless of the need at those circuits. Power could be supplied to the recording circuits during retrieval, which of course is unnecessary. Thus, the power consumption of the battery increases, which, in turn, shortens the battery life. This shortened life is magnified in an information processing device, such as a camera, that comprises a plurality of recording and retrieving heads.

SUMMARY OF THE INVENTION

An object of the present invention is to reduce a battery's power consumption in an information processing device including a magnetic recording unit. This information processing device may take the form of a camera with a film having a magnetic track.

In order to achieve this and other objects, an information processing device comprises a magnetic recording medium with a retrieval information device to retrieve recorded information on a recording medium. A power source supplies power to the device only when the device is required to operate.

The information processing device may also comprise a magnetic recording device that records information on a magnetic recording medium. A power source supplies power to the device only when the device is required to operate.

A further object is achieved by providing an information processing device including a device to retrieve information from the magnetic recording medium and to record information on the magnetic recording medium of the film. A power source supply supplies power to the device only when the device retrieves information in a different time period from when the device records.

Depending on the number of recording tracks on the recording medium, the device may include a corresponding number of retrieving devices or recording devices. Also, the power source supply supplies power only during retrieval or recording.

The power supply can be controlled by detecting particular recording medium. For example, if the recording medium is a film, the power supply could be controlled by perforations provided in the film. If the time period when power is supplied is determined based on the result of the perforation detection, the power supply is started when a front end edge of a first perforation is detected. The retrieval and recording is started when a rear end edge of the perforation is detected. The power supply is stopped when the retrieval and the recording are completed. Therefore, if using a camera and film, a photo interrupter, normally used for controlling the film feeding, can also be used as a power source supply control for the retrieval and recording.

Therefore, the power is supplied only when the retrieval and recording are required to operate. Therefore, the power consumption of the information processing device's battery is reduced.

Alternatively, the power supply can be started when the film feeding is started following the picture taking. The power supply is stopped when the retrieval and recording are completed. Thus, the battery power consumption can be reduced, even for a magnetic recording camera, without a perforation detection circuit or a film encoder.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
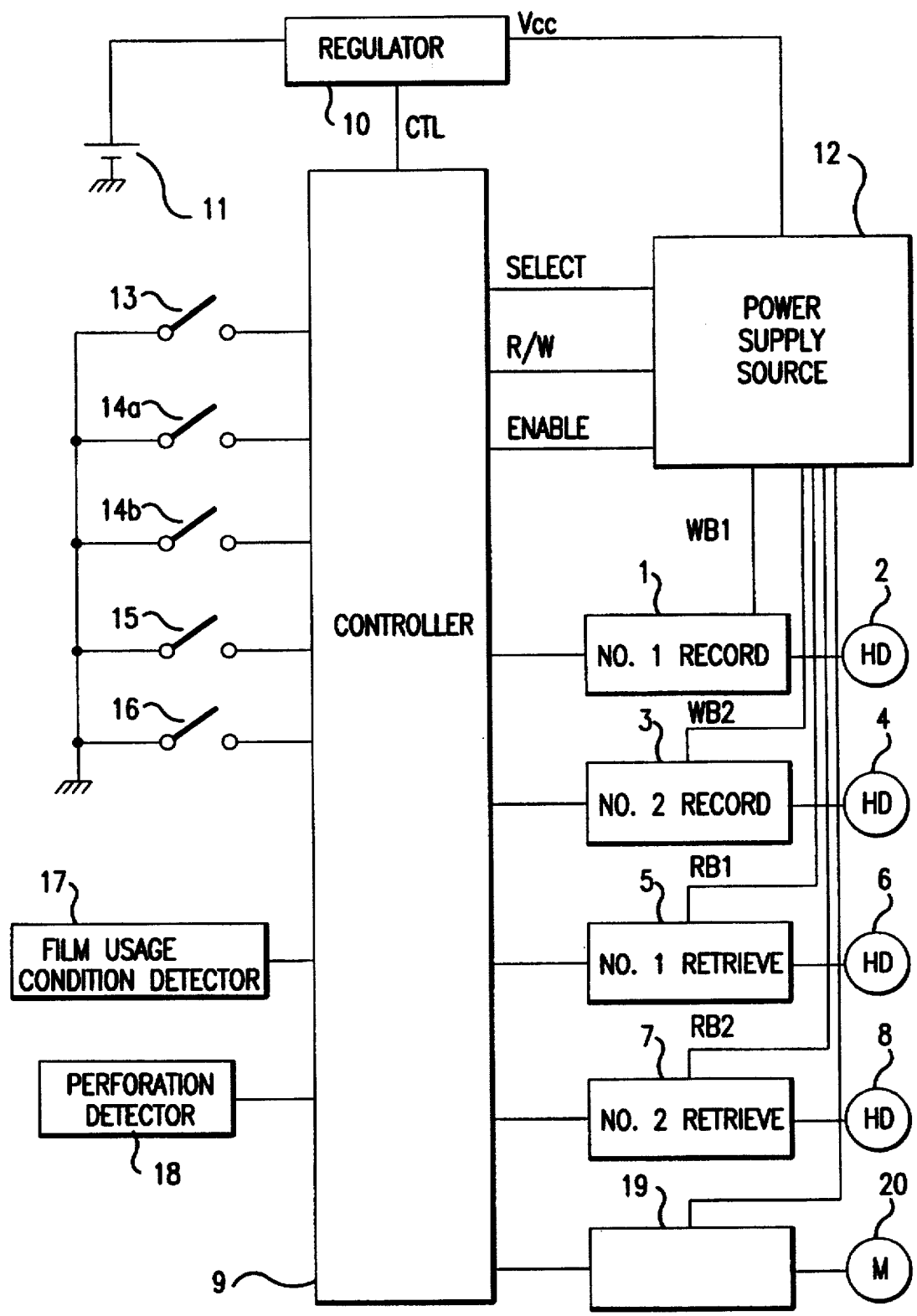
FIG. 1 is a schematic block diagram illustrating the structure of a first preferred embodiment of the invention.

FIG. 1 is a schematic block diagram of an information processing device, such as a camera, according to a preferred embodiment of the invention. The information processing device in which information is recorded and retrieved will be explained using a camera as the device and a film as the recording medium. These are only exemplary and illustrative. The description is not intended to limit the invention in any way. Other appropriate or equivalent devices or mediums may be used.

Figure 8:
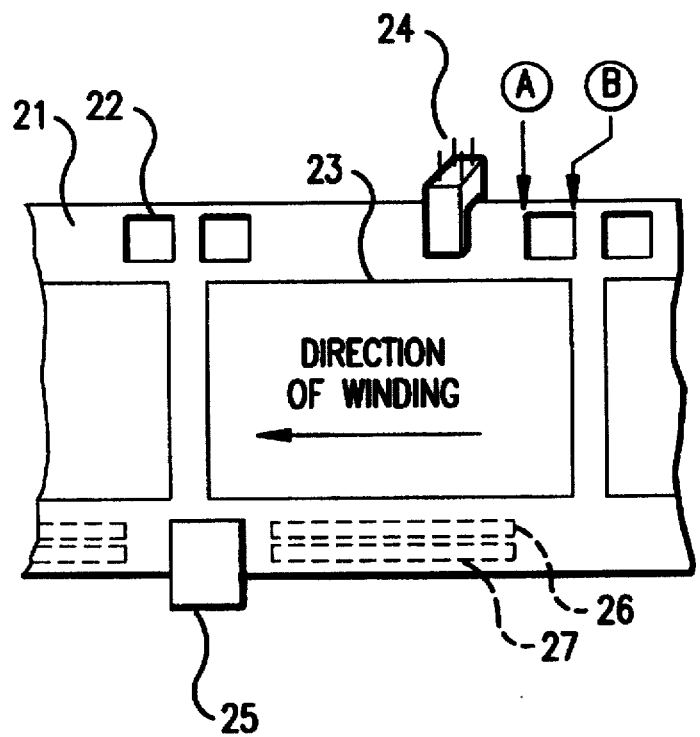
FIG. 8 is a drawing illustrating the recording and retrieval operation on the magnetic track of a film.
Figure 9:
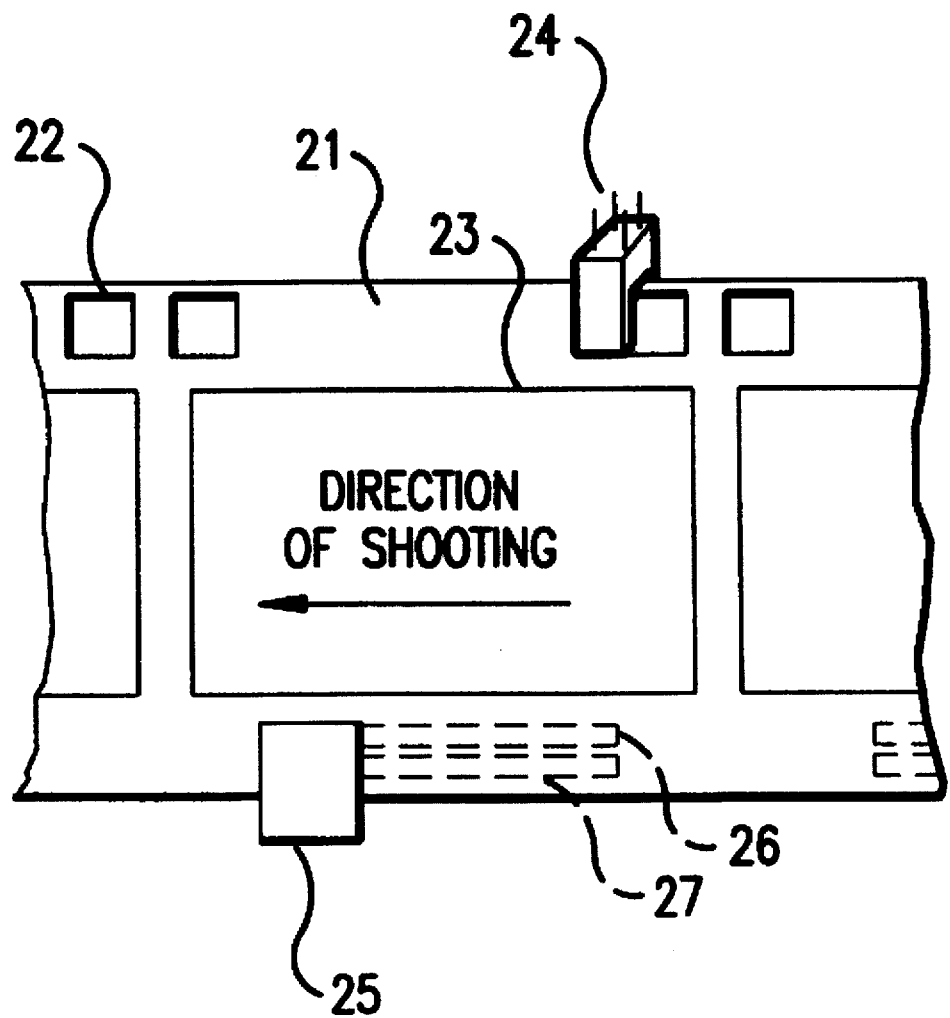
FIG. 9 is a drawing illustrating the recording and retrieval operation on the magnetic track of a film.

A camera includes at least one sensor, preferably at least four sets of sensors or assemblies, such as circuits 1, 3, 5 and 7 and magnetic heads 2, 4, 6 and 8, which record and retrieve information on a magnetic recording medium such as film 21. The film 21 has at least two magnetic tracks 26 and 27 as seen in FIGS. 8 and 9. The first recording circuit 1 drives the magnetic recording head 2 and records data on the first magnetic track 26. The second recording circuit 3 drives the magnetic recording head 4 and records data on the second magnetic track 27. The first recording circuit 1 and the recording head 2, and the second recording circuit 3 and the recording head 4 are part of a recording assembly.

The first retrieval circuit 5 drives the magnetic retrieval head 6 to retrieve data that is recorded on the first magnetic track 26. The second retrieval circuit 7 drives the magnetic retrieval head 8 to retrieve data that is recorded on the second magnetic track 27. The first retrieving circuit 5 and the retrieving head 6, and the second retrieving circuit 7 and the retrieving head 8 are part of a retrieval assembly.

The recording circuits 1 and 3 and the retrieval circuits 5 and 7 are connected to a controller 9. The information to be recorded on the film 21 is sent to the recording circuits 1 and 3 from the controller 9. The information retrieved from the magnetic tracks is sent by the controller 9 to the recording circuits 1 and 3. The retrieval heads 6 and 8 and the recording heads 2 and 4 are embedded in a magnetic head 25 shown in FIGS. 8 and 9. The controller 9 and the power source supply circuit 12 are part of a power source assembly.

In the illustrated embodiment, the controller 9 can be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller 9 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller 9 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 3–7 can be used as the controller 9. As shown, a distributed processing architecture is preferred for maximum data/signal processing capability and speed.

A regulator 10 includes a DC—DC converter. Upon receiving a control signal CTL from the controller 9, regulator 10 supplies a voltage from a battery 11 to a power source supply circuit 12 after the voltage has been raised to a predetermined voltage $V_{cc}$. The regulator 10 also supplies power to the other circuits and equipment of the device, as explained hereinafter.

The power source supply circuit 12 controls the power source supply. In particular, the bias current supply to the recording and retrieval circuits 1 and 3 and 5 and 7, respectively, is controlled based on a SELECT signal, a R/W signal, and an ENABLE signal, each originating from the controller 9. WB1 is a bias current supply line to the first recording circuit 1, WB2 is a bias current supply line to the second recording circuit 3, RB1 is a bias current supply line to the first retrieving circuit 5, and RB2 is a bias current supply line to the second retrieval circuit 7.

The device in the exemplary form of a camera also includes a main switch 13, a release switch, which includes a half-depression switch 14a and a full-depression switch 14b, a track selection switch 15, a cartridge mounting detection switch 16, a cartridge usage condition detection circuit 17, a perforation detection circuit 18, and a driver 19, all of which are connected to the controller 9.

The main switch 13 permits power to be supplied to the camera from the power source. The half-depression switch 14a starts an auto-focus process and shooting lens photometry according to any well-known auto-focus and photometry devices. The half-depression switch 14a is turned on by a half depression of a release button (not shown). Moreover, the full-depression switch 14b, which is turned on by a full depression of the release button, starts the actual shooting operation. The full depression switch 14b turns off the power supply to the recording and retrieval circuits 1, 3, 5 and 7.

The track selection switch 15 selects whether the recording and retrieval of information is performed for only a first track 26 or for both the first and second tracks 26 and 27.

A cartridge mounting detection switch 16 detects the presence of a film cartridge in the camera. A cartridge usage condition detection circuit 17 detects whether the film cartridge is either unused, partially used or completely used having no unexposed frames. Various methods for recording the film usage condition, including magnetically recording information on part of the cartridge, mechanically recording information on a part of the cartridge or magnetically recording information on a leader section of the film, can be used in conjunction with the cartridge usage condition detection circuit 17. The film usage condition enables the mounting of an unused film cartridge or partially used film cartridge, however prohibits the mounting of a completely used film cartridge, thus preventing possible double exposure.

The perforation detection circuit 18 detects a perforation 22 in the film 21. The perforation detection circuit 18 may use a photo interrupter 24 as shown in FIGS. 8 and 9. However, the photo interrupter 24 is only exemplary and any other suitable device or means that detects a perforation can be employed. The controller 9 controls the power supply to the recording and the retrieval circuits 1, 3, 5 and 7, and feeds the film as needed based on the perforation detection signal from the perforation detection circuit 18. The perforation detection circuit 18 is part of a perforation detection assembly.

A driver 19 unwinds and rewinds the film from the film cartridge. The driver 19 drives a film feeding motor 20. In a camera with a normal winding structure, a winding of film after the exposure of each shooting frame is utilized. However, this is only exemplary and any other equivalent winding/rewinding methods may be utilized.

Figure 2:
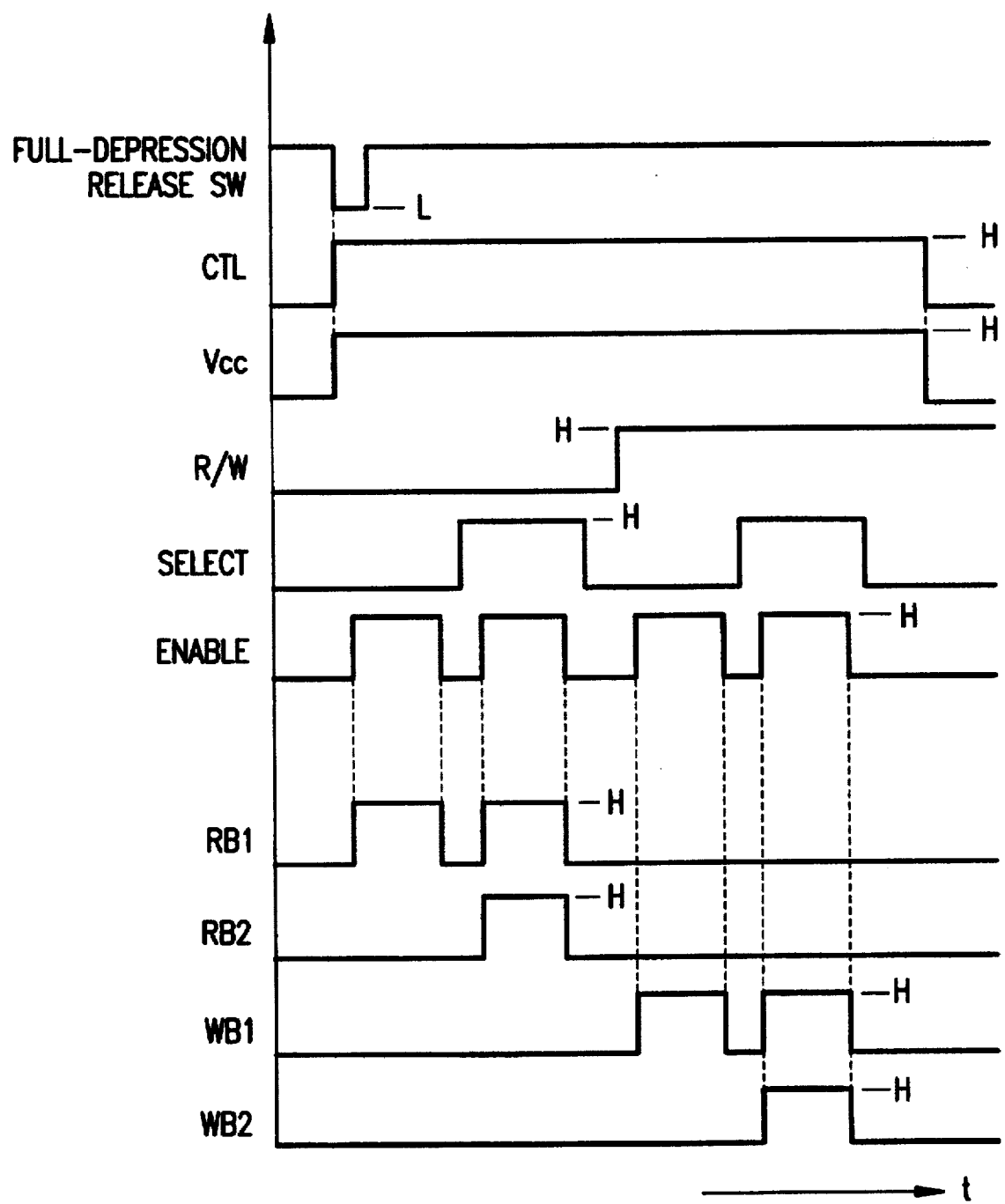
FIG. 2 is a time chart illustrating the power source supply timing for the recording and retrieval circuits.
Figure 3:
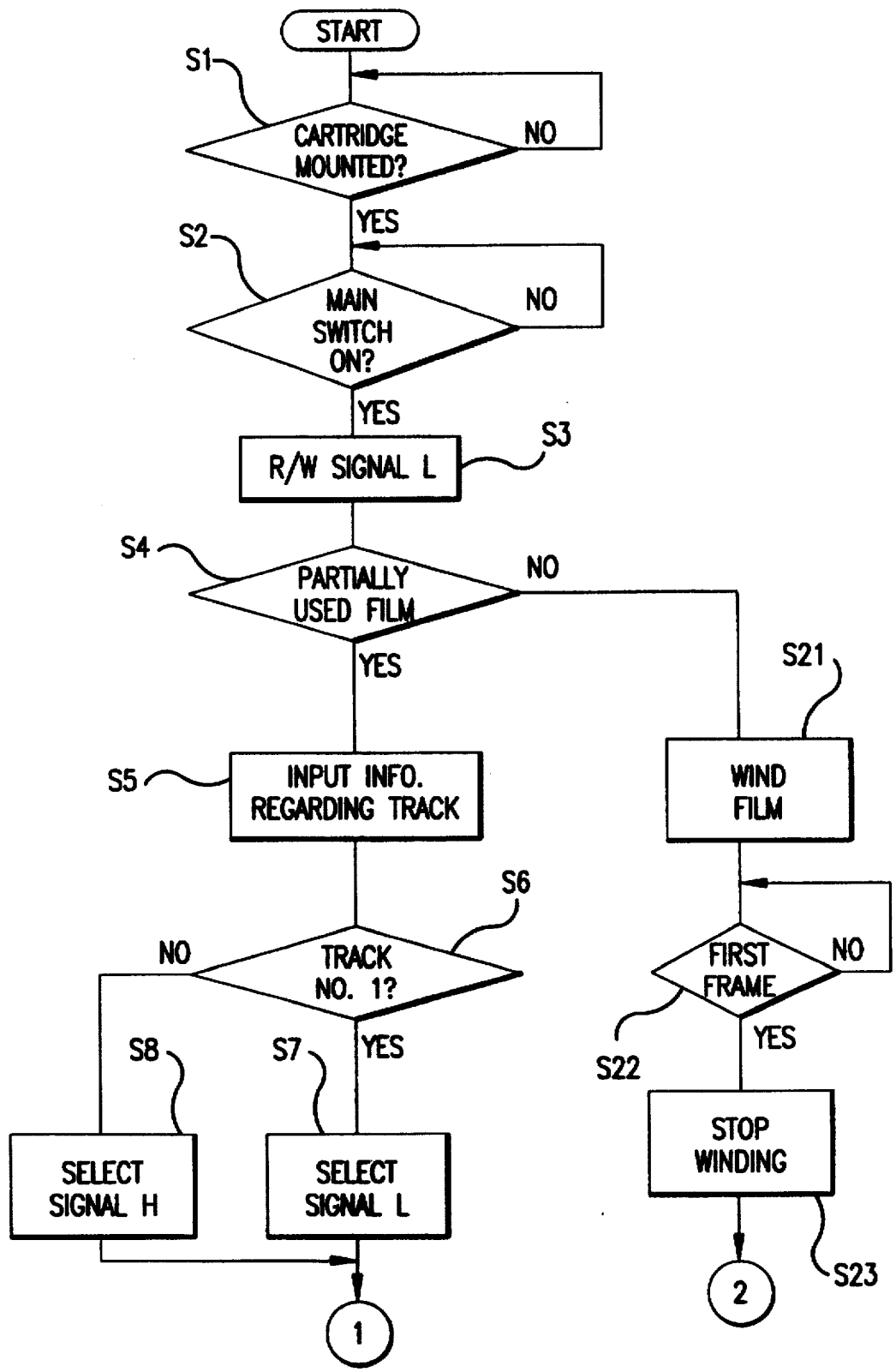
FIG. 3 is a flow chart illustrating a control routine.
Figure 4:
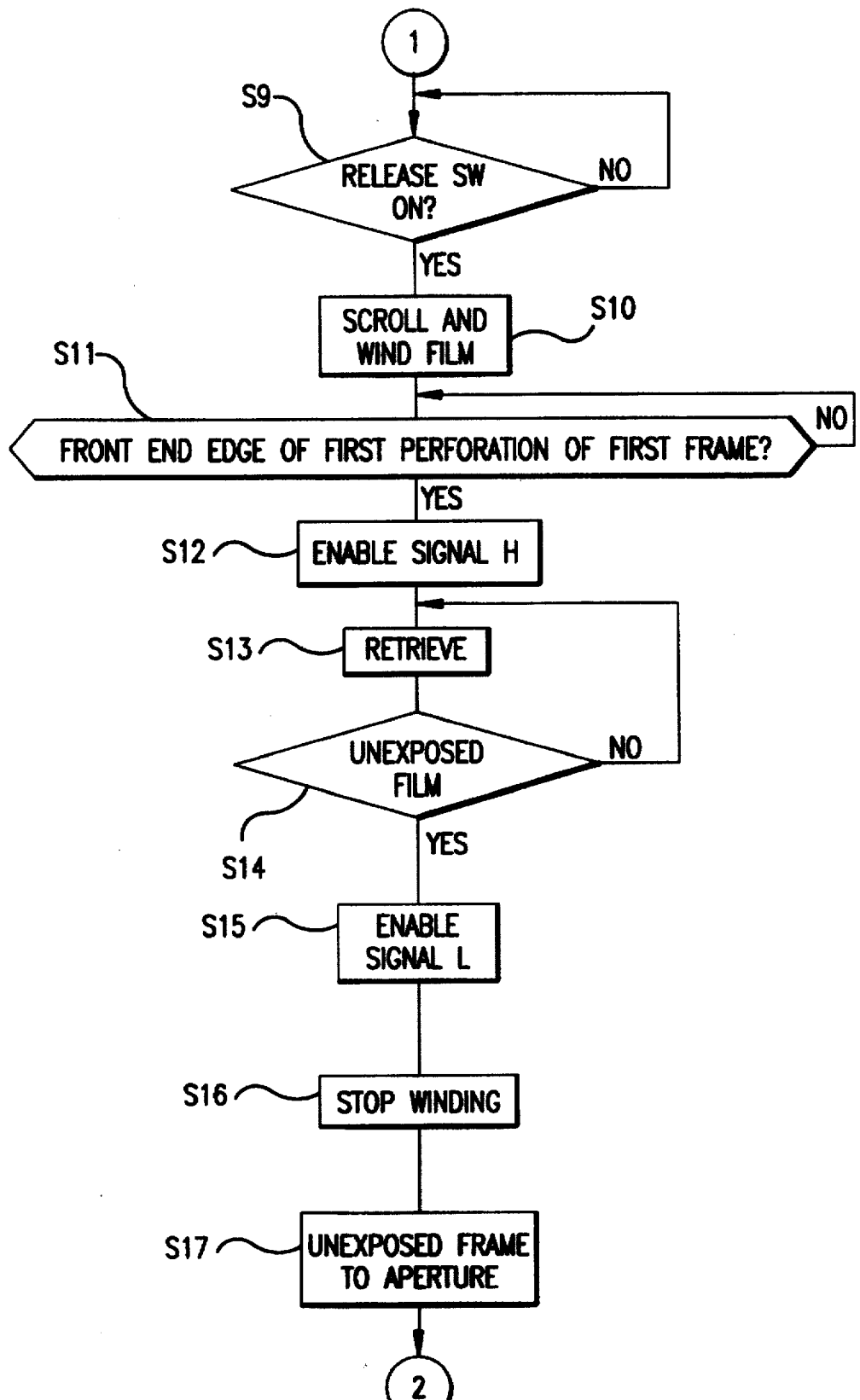
FIG. 4 is a continuation of the flow chart illustrating the control routine from FIG. 3.
Figure 5:
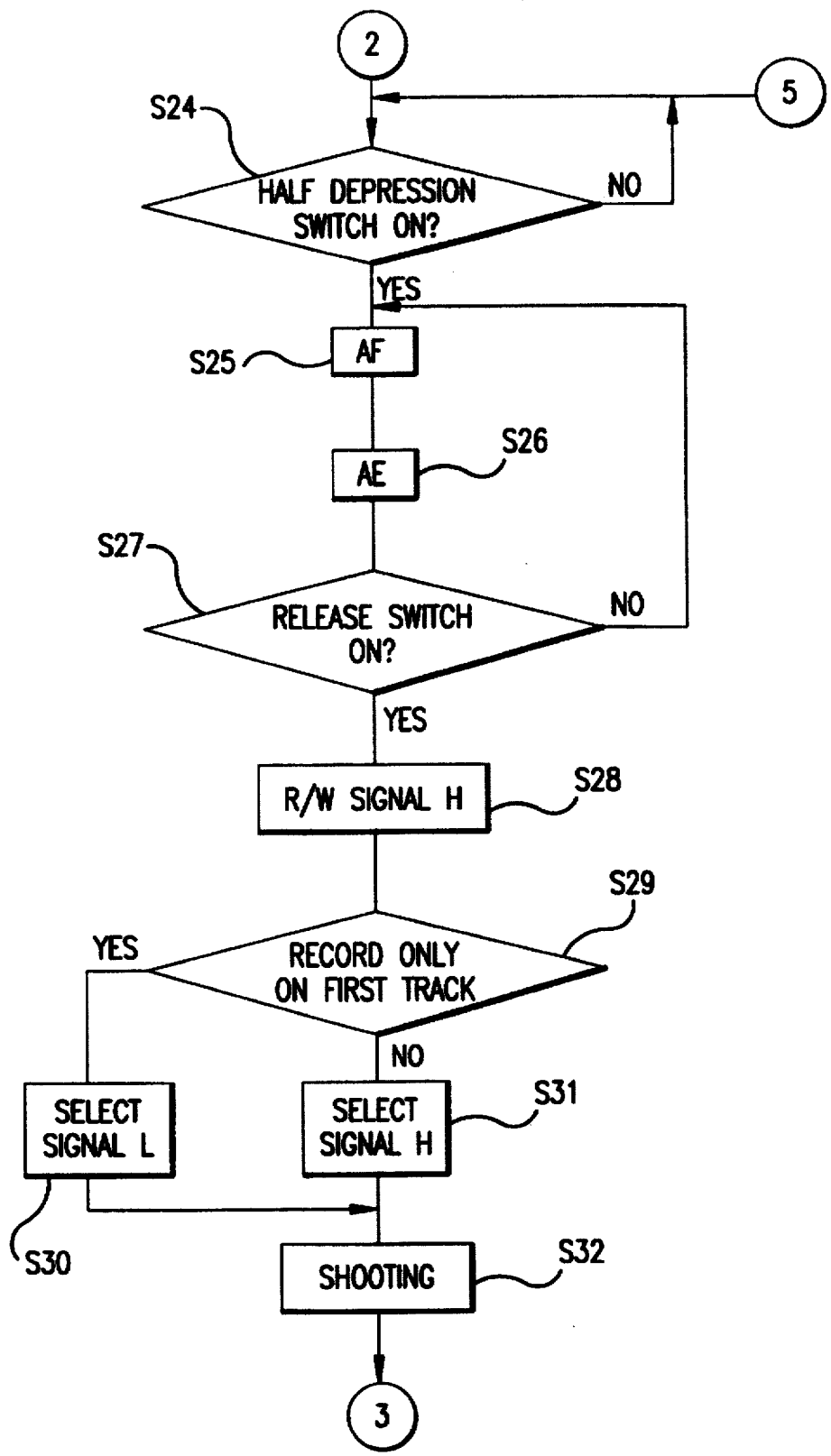
FIG. 5 is a continuation of the flow chart illustrating the control routine from FIG. 4.
Figure 6:
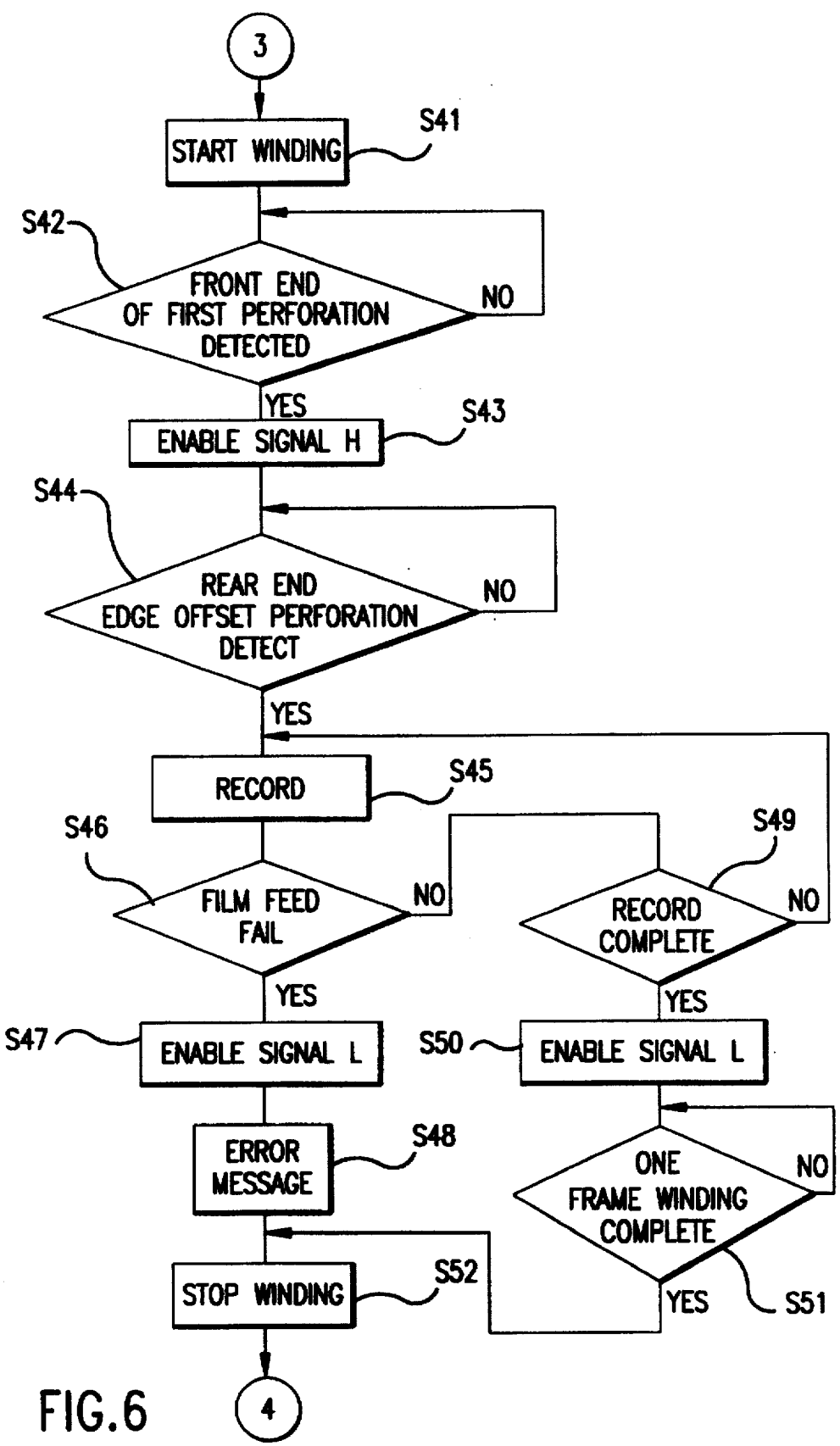
FIG. 6 is a continuation flow chart illustrating the control routine from FIG. 5.
Figure 7:
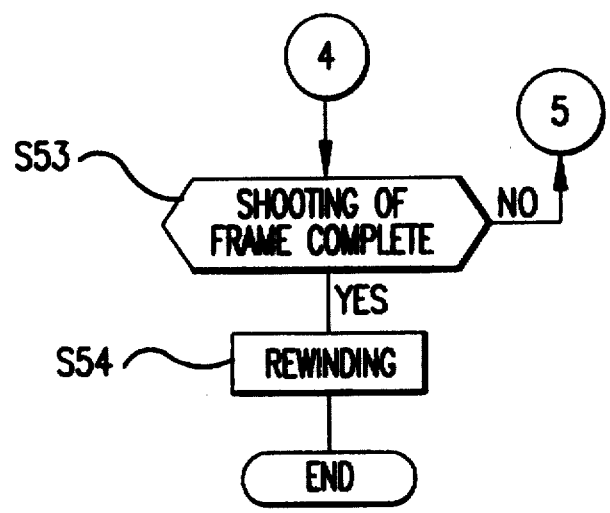
FIG. 7 is a continuation of the flow chart describing the control routine of the from FIG. 6.

FIG. 2 is a timing chart illustrating the power source supply for the recording and retrieving circuits 1, 3, 5, and 7. The SELECT signal switches the recording/retrieval operation between the two magnetic tracks 26 and 27. The first track 26 is selected during the Lo level. The first and second tracks 26 and 27 are selected during the Hi level. An R/W signal switches the operation between a Lo level for a retrieval operation and a Hi level for a recording operation. The ENABLE signal is a timing signal that starts the bias current supply to the recording and retrieving circuits 1, 3, 5 and 7. The Hi level is enabled when the information recording and retrieval period is necessary after the release operation.

After the release operation, by the full-depression release switch 14b, the controller 9 sets control signal CTL to the Hi level. Controller 9 also supplies voltage Vcc from the regulator 10 to the power source supply circuit 12.

When the R/W signal is set at the Lo level, i.e., in a retrieval operation, a bias current is supplied to the first retrieving circuit 5 via the bias current supply line RB1. This occurs when the ENABLE signal is switched to the Hi level. If the SELECT signal is set to the Hi level, the bias current is supplied to the second retrieving circuit 7 via the bias current supply line RB2. This occurs when the ENABLE signal is switched from the Hi level.

Moreover, when the R/W signal is at the Hi level, i.e., in the recording operation, the bias current is supplied to the first recording circuit 1 via the bias current supply line WB1. This occurs when the ENABLE signal is switched to the Hi level. If the SELECT signal is set at the Hi level, the bias current is supplied to the second recording circuit 3 via the bias current supply line WB2. This occurs when the ENABLE signal is switched from the Lo level.

FIGS. 3–7 represent a flow chart that describes the control routine or program for the controller 9. FIGS. 8 and 9 describe the recording and the retrieving operations on the magnetic tracks of the film. The operation will be explained referencing these figures. As noted above, the operation is described with the information processing device as a camera and the recording medium as a film cartridge, however these are only exemplary.

At step S1, the cartridge mounting detection switch 16 determines whether a film cartridge has been mounted in the camera. If the film cartridge is mounted, the controller 9 moves to step S2, where the controller determines whether the main switch 13 is turned on. If the main switch 13 is turned on, the controller 9 then moves to step S3, where the controller 9 starts a retrieval operation by changing the R/W signal to the Lo level.

At step S4, the film condition is detected from the film usage condition detection circuit 17. If a partially used film cartridge is detected, the controller 9 moves to step S5. If the film cartridge is unused, the controller 9 moves to step S21. The camera is configured so a completely used film cartridge cannot be mounted and thus prohibits film feeding. An error message will be displayed on the camera indicating that a completely used film cartridge has been mounted.

Steps S5–S17 illustrate the operation of the device when a partially used film cartridge with partially used film is mounted. An unexposed frame must be set to the shooting position for the operation to start. Also, the recorded shooting information from the magnetic track for each frame must be retrieved while the film is unwound from the cartridge. The controller determines whether the frame currently passing the magnetic head 25 is exposed or unexposed. When an unexposed frame is detected, the unwinding is stopped and the unexposed frame is set at a shooting position.

At step S5, retrieving track selection information from the track selection switch 15 is input into the controller 9. At step S6, the controller 9 determines whether the number of tracks selected is one. The controller 9 then moves to step S7 to retrieve shooting information recorded on the first track 26, where the SELECT signal is changed to the Lo level. Thus, the first retrieving circuit 5 is established as the target circuit for the bias current supply.

However, if shooting information is recorded on both magnetic tracks 26 and 27 and is needed to be retrieved, the controller 9 moves to step S8. At step S8 the SELECT signal is changed to the Hi level. Thus, the first and second retrieving circuits 5 and 7 are established as target circuits for the bias current supply.

Upon establishment of the proper SELECT signal, the controller 9 moves to step S9, where a determination is made of whether the full-depression release switch 14b is turned on. If the full-depression release switch 14b is on and the shutter has been released, the controller moves to step S10. At step S10, the driver 19 and the film feeding motor 20 feed the film from the film cartridge.

At step S11, the controller 9 determines whether the perforation detection circuit 18 has detected a first frame first perforation front end edge. As seen in FIG. 8, two perforations 22 are provided for each shooting frame 23. Assuming that the shooting frame 23 shown in FIG. 8 is the first or first unexposed frame, the perforation on the right side edge is the detected first perforation after the start of winding following an exposure. The perforation edge at point A is the front end edge and the edge at point B is the rear end edge taken in the film winding direction. Once the film 21 is wound and the photo interrupter 24 reaches position A, the controller moves to step S12. At step S12 the ENABLE signal is set to the Hi level. The bias current supply to the retrieving circuit that was established by the SELECT signal at steps S7 or S8 is then started.

Next at step S13, the selected retrieving circuit reads and retrieves any shooting information that is recorded on the film's magnetic track. For example, assuming that the shooting frame 23 is the first frame, the magnetic head 25 starts the retrieval operation. If only the first retrieving circuit 5 has been selected, the shooting information on the first track 26 is retrieved by the first retrieving circuit 5 and retrieving head 6. However, if both the first and second retrieving circuits are selected, the shooting information recorded on the first and second tracks 26 and 27 is retrieved by the first retrieving circuit 5 and the retrieving head 6, the second retrieving circuit 7 and the retrieving head 8, respectively.

At step S14, the controller 9 determines whether an unexposed frame has been detected based on the information retrieved at step S14. If an unexposed frame is detected, the controller 9 then moves to step S15; otherwise the controller 9 returns to step S13 to continue the retrieval operation.

If an unexposed frame is detected, the ENABLE signal is changed to Lo at step S15 and the bias current supply to the retrieving circuit is also stopped. After the bias current is stopped, the driver 19 stops the motor 20 and film winding at step S16. Next, at step S17, the driver 19 controls the motor to feed film so that the detected unexposed frame is at the shooting position. The unexposed frame has passed the shooting position when the magnetic head 25 completes the reading of the unexposed frame information. Therefore, after the film winding has stopped, the unexposed frame is at the shooting position.

If the mounted film cartridge is unused in step S4, the first film frame is moved to the shooting position as follows. At step S21, the driver 19 controls the motor 20 and the film is unwound from the film cartridge. Next, at step S22, the controller 9 determines whether the first frame is in the shooting position. If the first frame is in the shooting position, the controller 9 moves to step S23, where the film unwinding is stopped.

At step S24, the controller 9 determines whether the half-depression release switch 14a has been half depressed. If the release button is half depressed, the controller 9 moves to step S25. At step S25, a shooting lens focus adjustment is conducted by any appropriate and well-known focus adjustment device (not shown). The diaphragm and the shutter speed are then set, at step S26, also by any appropriate and well-known exposure device (not shown).

At step S27, the controller 9 determines whether a release operation has occurred and whether the full-depression release switch 14b is on. If the release operation has occurred and complete, the controller 9 moves to step S28, where the R/W signal is changed to the Hi level and the recording operation is selected.

Next, at step S29, the controller 9 determines whether shooting information has been recorded on the first track 26 only. If shooting information is recorded on the first track 26 only, the controller 9 moves to step S30. At step S30, the SELECT signal is changed to the Lo level. However, if the shooting information is recorded on both the first and second tracks 26 and 27, the controller 9 moves to step S31. At step S31, the SELECT signal is changed to the Hi level.

The number of recording tracks on which information is recorded can be determined by any appropriate number, including the amount of recorded information. Both recording tracks can be used to store information depending on the amount of recorded information. If the SELECT signal designates only a first track 26, the shooting information is recorded on the first track 26 by the first recording circuit 1 and the recording head 2. If both the first and second tracks 26 and 27 are selected, the information is recorded on both the first and second tracks 26 and 27 by the first recording circuit 1 and recording head 2, and the second recording circuit 3 and recording head 4, respectively.

At step S32, the controller 9 performs a shooting operation using a previously set diaphragm and shutter speed. The controller 9 then moves to step S41 where the driver 19 and motor 20 feed the film. At step S42, the controller 9 determines whether the front end edge A of the exposed shooting frame's first perforation is detected by the perforation detection circuit 18.

If the front end edge A is detected, the controller 9 moves to step S43, where the ENABLE signal is changed to the Hi level and the bias current supply to the recording circuit is started. For example, if the shooting frame 23 shown in FIGS. 8 and 9 is the shooting frame immediately after an exposed frame, the winding of the film 21 is started at the position shown in FIG. 8. As soon as front end edge A is detected, the bias current supply to the recording circuit is started.

At step S44, the controller 9 determines whether the first perforation rear end edge B is detected by the perforation detection circuit 18. If the rear end edge B is detected, the controller 9 moves to step S45, where the recording operation is started by the selected recording circuit. By setting a start for the information recording operation, the supply from the power source to the recording circuit can be controlled by the photo interrupter. This results in an economical system, which conserves power, with only one photo interrupter.

At step S46, the controller 9 determines if the film feeding has failed during film feeding. If the film feeding has failed, the controller 9 moves to step S47. If the film feeding is complete, the controller 9 moves to step S49, where the controller 9 determines whether an acceptable or normal film feeding amount has been made. At step S49, the controller 9 also determines a time for film feeding based on the perforation detection signal. For example, the film feeding is normal if a predetermined amount of film is fed within a fixed time period. If the film feeding is normal, the controller 9 determines if the information recording is complete. If complete, the controller 9 moves to step S50. Otherwise, the controller 9 returns to step S45 to continue the recording operation.

If the film feeding fails, the controller 9 moves to step S47, where the ENABLE signal is changed to the Lo level and the bias current supply to the recording circuit is thus stopped. This in turn stops the recording operation. The controller 9 then moves to step S48 where an error message is displayed on display equipment (not shown).

Next, at step S50, the ENABLE signal is changed to the Lo level and the bias current supply to the recording circuit is stopped. The controller 9 then moves to step S51 after completion of a recording operation.

At step S51, the controller 9 winds one film frame until complete and the next shooting frame reaches the predetermined shooting position. When the next frame reaches the shooting position, the controller 9 moves to step S52 where the film winding is stopped. At step S53, the controller 9 determines if all the frames of the film have been exposed. If all the frames of the film have been exposed, the controller 9 moves to step S54 where the film is rewound into the film cartridge by the driver 19 and the motor 20. Otherwise, the controller 9 returns to step S24.

As described above, the power source supply to the recording and the retrieving circuits is started when the photo interrupter detects the first perforation front end edge of each shooting frame. However, the start of the supply from the power source is not limited to the above-described embodiment and can be determined using the output of an encoder, which detects a feeding amount of the film.

The ENABLE signal is described above as able to change to the Hi level with the film winding so the power source supply can be started. This results in an economical and energy conserving camera, which does not necessarily include a photo interrupter and a film encoder. The electric current consumption is slightly higher than using only a camera with a photo interrupter, however a substantial amount of unnecessary power consumption is not used, compared to a conventional camera.

The information processing device, as described above, uses a camera with a normal winding assembly and procedure, where the film is exposed frame-by-frame and the winding of each frame. However, the present invention can also be used with a camera having a pre-wind method, where the entire film is wound by first winding from the film cartridge prior to shooting and then rewinding each frame back into the film cartridge after being shot. In this case, the positions of the photo interrupter 24 and the magnetic head 25, with respect to the shooting frame, are changed to horizontally symmetrical positions. Further, the control program, described in FIGS. 3–7, can be changed as needed for use in the pre-wind method.

As described above, power is supplied to the retrieving assembly, only during retrieval, and to the recording assembly, only during recording. Therefore, the power consumption of the battery can be conserved. The power source is only supplied to retrieval assembly when actually performing retrieving operations. Therefore, the power consumption is conserved.

As described above, the time period for supplying the power is determined by perforation detection. For example, the power supply is started when the perforation's front end edge is detected after film feeding is started. The retrieval and recording operation is then started when the perforation's rear end edge is detected. The power supply is stopped when the retrieval and the recording operations are complete. Thus, a photo interrupter, which is normally used for controlling the film feeding, can also be used as power source supply control for the retrieval and recording assemblies. This results in an economical and energy conserving camera.

While separate sensors have been described above, with respect to the four sets of recording and retrieval circuits 1, 3, 5 and 7 and magnetic heads 2, 4, 6 and 8, all the sensors may be incorporated into one sensor. This "integral" sensor accomplishes the functions of each of the individual sensors.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An information processing device that retrieves information from a recording medium, the device comprising:
   at least one retrieval device that retrieves information from the recording medium;
   a power source, which is electrically connected to the retrieval device, and which supplies power to the at least one retrieval device only during a time period when the at least one retrieval device is in operation; and
   a perforation detector, which is electrically connected to the power source, and which detects a perforation in the recording medium, wherein the time period is started on the detection of a perforation.

2. The device according to claim 1, wherein the at least one retrieval device comprises a plurality of retrieval devices, wherein the power source supplies power only to the retrieval devices that are actually retrieving information during the time period.

3. The device according to claim 1, wherein the power source starts supplying power when a front end edge of a first perforation is detected by the perforation detector, the at least one retrieval device starts retrieval when a rear end edge of the first perforation is detected by the perforation detector, and the power source stops supplying power when the retrieval is completed.

4. The device according to claim 1, wherein the information processing device is a camera and the recording medium is film.

5. The device according to claim 4, wherein the information is retrieved by a magnetic retrieval head from a magnetic track on the film.

6. The device according to claim 1, wherein the recording medium is fed to the information processing device, the power source starts supplying power when a feeding of the recording medium is started and stops supplying power when the at least one retrieval device completes retrieval of the information on the recording medium.

7. The device according to claim 6, wherein the power source starts supplying power to at least one retrieval device when a front end edge of a first perforation is detected by a perforation detector, the at least one retrieval device also starts retrieving when a rear end edge of the first perforation is detected by the perforation detector, and the power source stops supplying power when the retrieving is complete.

8. An information processing device that records information on a recording medium, the device comprising:
   at least one recording device that records information on the recording medium;
   a power source, which is electrically connected to the recording device, and which supplies power to the at least one recording device only during a time period when the at least one recording device is in operation; and
   a perforation detector, which is electrically connected to the power source, and which detects a perforation in the recording medium, wherein the time period is started on the detection of a perforation.

9. The device according to claim 8, wherein the at least one recording device comprises a plurality of recording devices, wherein the power source supplies power only to the recording devices that are actually recording information during the time period.

10. The device according to claim 8, wherein the power source starts supplying power when a front end edge of a first perforation is detected by the perforation detector, the at least one recording device starts recording when a rear end edge of the first perforation is detected by the perforation detector, and the power source stops supplying power when the recording is completed.

11. The device according to claim 8, wherein the information processing device is a camera and the recording medium is film.

12. The device according to claim 11, wherein the information is recorded by a magnetic recording head onto a magnetic track on the film.

13. The device according to claim 8, wherein the recording medium is fed to the information processing device and the power source starts supplying power when feeding of the recording medium starts and stops supplying power when the recording operation is complete.

14. The device according to claim 13, wherein the power source starts supplying power when a front end edge of a first perforation is detected by a perforation detector, and the at least one recording device starts recording when a rear end edge of the first perforation is detected by the perforation detector, and the power source stops supplying power when the recording is complete.

15. An information processing device that retrieves and records information on a recording medium, the device comprising:
   at least one assembly that retrieves information recorded on the recording medium and records information on the recording medium;
   a power source, which is electrically connected to the assembly, and which supplies power to the at least one assembly only during a first time period when the at least one assembly retrieves information and during a second time period, different from the first time period, when the at least one assembly records information; and
   a perforation detector, which is electrically connected to the power source, and which detects a perforation in the recording medium, wherein one of the first time period and the second time period is started on the detection of a perforation.

16. The device according to claim 15, wherein the at least one assembly comprises a plurality of assemblies that record and retrieve, the power source supplies power only to the assemblies that are actually retrieving information during the first time period or recording information during the second time period.

17. The device according to claim 15, wherein the power source starts supplying power when a front end edge of a first perforation is detected by the perforation detector, the at least one assembly starts retrieval when a rear end edge of the first perforation is detected by the perforation detector, and the power source stops supplying power when the retrieval is complete.

18. The device according to claim 15, wherein the information processing device is a camera and the recording medium is film.

19. The device according to claim 18, wherein the information is on a magnetic track on the film, the at least one assembly including a magnetic retrieval head and a magnetic recording head.

20. The device according to claim 15, wherein the recording medium is fed to the information processing device and the power source starts supplying power when feeding of the recording medium starts and stops supplying power when the retrieving and recording operation is complete.

21. A method for retrieving information recorded on a recording medium using at least one retrieval device that retrieves the information recorded on the recording medium, the method comprising the steps of:

supplying power from a power source to the at least one retrieval device only during a time period when the at least one retrieval device is in operation;

retrieving the recorded information from the recording medium using the at least one retrieval device when the power is supplied; and detecting a perforation in the recording medium prior to the supplying step, the time period of the supplying step being based on the detection of the perforation.

22. A method according to claim 21, wherein the at least one retrieval device comprises a plurality of retrieval devices, wherein the supplying step comprises supplying power only to the retrieval devices that are actually retrieving information during the time period.

23. A method according to claim 21, further comprising the steps of supplying power when a front end edge of a first perforation is detected by the detecting step and stopping the supply of power when the retrieving step is complete.

24. A method according to claim 21, further comprising the step of feeding the medium, starting the supply of power to the at least one retrieval device when the feeding step is started and stopping the supply of power when the retrieving step is complete.

25. A method for recording information on a recording medium using at least one recording device that records information on the recording medium, the method comprising the steps of:

supplying power from a power source to the at least one recording device only during a time period when the at least one recording device is in operation;

recording information on the recording medium using the at least one recording device when the power is supplied; and detecting a perforation in the recording medium prior to the supplying step, the time period of the supplying step being based on the detection of a perforation.

26. A method according to claim 25, wherein the at least one recording device comprises a plurality of recording devices, wherein the supplying step comprises supplying power only to the recording devices that are actually recording information during the time period.

27. A method according to claim 25, further comprising the steps of supplying power when a front end edge of a first perforation is detected by the detecting step and stopping the supply power when the recording step is complete.

28. A method according to claim 25, further comprising the steps of feeding the medium, starting the supply of power to the at least one recording device when the feeding step is started and stopping the supply of power when the recording step is complete.

29. A method according to claim 28, further comprising the steps of starting the supply of power when a front end edge of a first perforation is detected by the detecting step, starting recording when a rear end edge of the first perforation is detected by the detecting step, and stopping the supply of power when the recording step is complete.

30. A method for retrieving and recording information on a recording medium using at least one assembly that retrieves and records information on the recording medium, the method comprising the steps of;

supplying power from a power source to the at least one assembly for retrieving information only during a first time period and supplying power to the at least one assembly for recording information only during a second time period, different from the first time period;

feeding the recording medium;

starting the supply of power after the start of the feeding; and stopping the supply of power when the retrieving and recording steps are complete.

31. A method according to claim 30, wherein the at least one assembly comprises a plurality of assemblies, wherein the method comprises further comprises the step of supplying power only to the assemblies that are actually retrieving or recording information.

32. A method according to claim 30, further comprising the steps detecting when a front end edge of a first perforation is detected, supplying power to the at least one assembly after the detection by the detecting step, detecting a rear edge of the first perforation, retrieving information when the rear end edge of the first perforation is detected, and stopping the supply when the retrieving step is complete.

33. A method according to claim 30, further comprising the steps of detecting a perforation in the recording medium and basing the first and second time periods on the detection by the detecting step.

34. An information processing device that retrieves information from a recording medium which is selectively fed to the information processing device, the device comprising:

at least one retrieval device that retrieves information from the recording medium;

a power source, which is electrically connected to the retrieval device, and which supplies power to the at least one retrieval device only during a time period when the at least one retrieval device is in operation whereby the power source starts supplying power when a feeding of the recording medium is started and stops supplying power when the at least one retrieval device completes retrieval of the information on the recording medium.

35. The device according to claim 34, wherein the power source starts supplying power to at least one retrieval device when a front end edge of a first perforation is detected by a perforation detector, the at least one retrieval device also starts retrieving when a rear end edge of the first perforation is detected by the perforation detector, and the power source stops supplying power when the retrieving is complete.

36. An information processing device that records information on a recording medium which is selectively fed to the information processing device, the device comprising:

at least one recording device that records information on the recording medium; and a power source which is electrically connected to the recording device, and which supplies power to the at least one recording device only during a time period when the at least one recording device is in operation whereby the power source starts supplying power when feeding of the recording medium starts and stops supplying power when the recording operation is complete.

37. The device according to claim 36, wherein the power source starts supplying power when a front end edge of a first perforation is detected by a perforation detector, and the at least one recording device starts recording when a rear end edge of the first perforation is detected by the perforation detector, and the power source stops supplying power when the recording is complete.

38. An information processing device that retrieves and records information on a recording medium which is selectively fed to the information processing device, the device comprising:

at least one assembly that retrieves information recorded on the recording medium and records information on the recording medium;

a power source, which is electrically connected to the assembly, and which supplies power to the at least one assembly only during a first time period when the at least one assembly retrieves information and during a second time period, different form the first time period, when the at least one assembly records information whereby the power source starts supplying power when feeding of the recording medium starts and stops supplying power when the retrieving and recording operation is complete.

39. A method for retrieving information recorded on a recording medium using at least one retrieval device that retrieves the information recorded on the recording medium, the method comprising the steps of:

supplying power from a power source to the at least one retrieval device only during a time period when the at least one retrieval device is in operation;

retrieving the recording information from the recording medium using the at least one retrieval device when the power is supplied;

feeding the medium;

starting the supply of power to the at least one retrieval device when the feeding step is started; and stopping the supply of power when the retrieving step is complete.

40. A method for recording information on a recording medium using at least one recording device that records information on the recording medium, the method comprising the steps of:

supplying power from a power source to the at least one recording device only during a time period when the at least one recording device is in operation;

recording information on the recording medium using the at least one recording device when the power is supplied;

feeding the medium;

starting the supply of power to the at least one recording device when the feeding step is started; and stopping the supply of power when the recording step is complete.

41. A method according to claim 40, further comprising the steps of starting the supply of power when a front end edge of a first perforation is detected by the detecting step, starting recording when a rear end edge of the first perforation is detected by the detecting step, and stopping the supply of power when the recording step is complete.

42. A method for retrieving and recording information on a recording medium using at least one assembly that retrieves and records information on the recording medium, the method comprising the steps of:

supplying power from a power source to the at least one assembly for retrieving information only during a first time period and supplying power to the at least one assembly for recording information only during a second time period, different from the first time period; and detecting when a front end edge of a first perforation is detected;

supplying power to the at least one assembly after the detection by the detecting step;

detecting a rear edge of the first perforation;

retrieving information when the rear end edge of the first perforation is detected; and stopping the supply when the retrieving step is complete.

43. A method for retrieving and recording information on a recording medium using at least one assembly that retrieves and records information on the recording medium, the method comprising the steps of:

supplying power from a power source to the at least one assembly for retrieving information only during a first time period and supplying power to the at least one assembly for recording information only during a second time period, different from the first time period; and detecting a perforation in the recording medium; and basing the first and second time periods on the detection by the detecting step.

44. An information processing device that retrieves information from a recording medium, the device comprising:

a plurality of retrieval devices each of which retrieves information from the recording medium;

an information generator for generating information indicating which retrieval device is operated among said plurality of retrieval devices;

a power source which is electrically connected to said plurality of retrieval devices and which can supply power to said plurality of retrieval devices; and an identifier device which is electrically connected to said power source and said information generating device and which identifies a retrieval device to which the power should be supplied, based on said information generated from said information generator, before said power source executes the power supply operation to said retrieval device;

wherein said power source supplies the power only to the retrieval device identified by said identifier device, only while the identified retrieval device is being operated.

45. The information processing device according to claim 44, wherein said information generator is a track selecting switch.

46. The information processing device according to claim 44, wherein said recording medium has a plurality of magnetic tracks; and said information generator generates information that selects a magnetic track from which information is retrieved by said retrieval device.

47. An information processing device that retrieves information from a recording medium, the device comprising:

a plurality of recording devices each of which records information to the recording medium;

an information generator for generating information indicating which recording device is operated among said plurality of recording devices;

a power source which is electrically connected to said plurality of recording devices and which can supply power to said plurality of recording devices; and an identifier device which is electrically connected to said power source and said information generating device and which identifies a recording device to which the power should be supplied, based on said information generated from said information generator, before said power source executes the power supply operation to said recording device;

wherein said power source supplies the power only to the recording device identified by said identifier device, only while the identified recording device is being operated.

48. The information processing device according to claim 47, wherein said information generator generates said information based on an amount of information to be recorded to said recording medium.

49. The information processing device according to claim 47, wherein said information generator generates said information based on contents of information to be recorded to said recording medium.

50. An information processing device which retrieves and records information on a recording medium, the device comprising:

a plurality of assembly devices each of which retrieves information recorded on the recording medium and records information on the recording medium;

an information generator for generating information indicating which assembly device is operated among said plurality of assembly devices;

a power source which is electrically connected to said plurality of assembly devices and which can supply power to said plurality of assembly devices; and an identifier device which is electrically connected to said power source and said information generating device and which identifies one assembly device to which the power should be supplied, based on said information generated from said information generator, before said power source executes the power supply operation to said assembly device;

wherein said power source supplies the power only to the assembly device identified by said identifier device, only during the first period in which the identified assembly device retrieves the information, and only the second period that is different from the first period, in which the identified assembly device records the information.

* * * * *